A. F. HENDERSON.
SURFACE IRRIGATING SYSTEM.
APPLICATION FILED AUG. 24, 1916.

1,254,906.

Patented Jan. 29, 1918.

Inventor
Alexander Franklin Henderson
By A.R. O'Neail
His Attorney

UNITED STATES PATENT OFFICE.

ALEXANDER FRANKLIN HENDERSON, OF WINNIPEG, MANITOBA, CANADA.

SURFACE-IRRIGATING SYSTEM.

1,254,906.  Specification of Letters Patent.  Patented Jan. 29, 1918.

Application filed August 24, 1916. Serial No. 116,669.

*To all whom it may concern:*

Be it known that I, ALEXANDER FRANKLIN HENDERSON, a citizen of the United States of America, residing at the city of Winnipeg, in the Province of Manitoba, in the Dominion of Canada, have invented certain new and useful Improvements in Surface-Irrigating Systems, of which the following is a specification.

This invention relates to surface irrigating systems and has for its object the provision of easily portable means which are flexible as to the extent of the area of ground which they may be made to cover and which provide for an even treatment of all such ground without regard to the nature of its surface or its proximity to the source of water supply. The said means will be found fully described in the following specification then more particularly pointed out in the appended claims, reference also being had to the drawings forming part hereof, in which similar characters of reference refer to similar parts throughout the different views, and in which—

Figure 1:
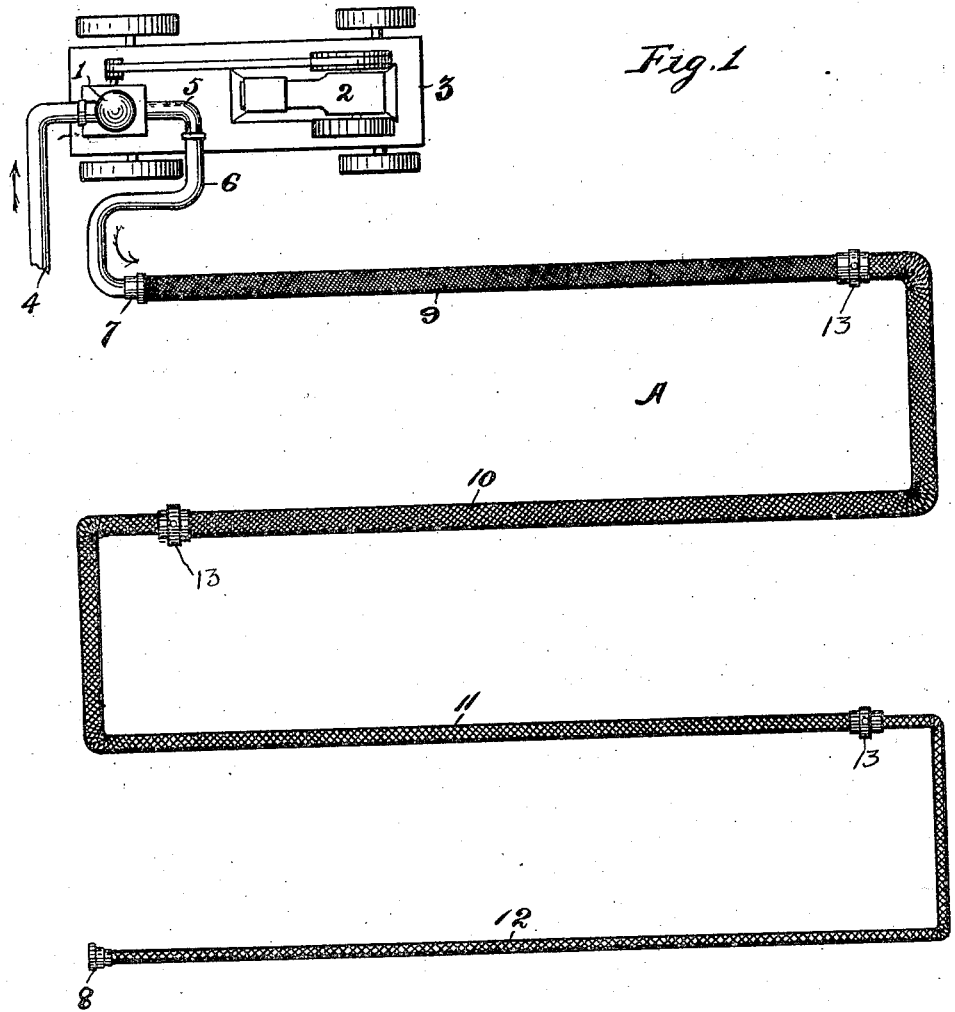

Figure 1 is a plan view of an irrigating system in which four sections of hose are shown in order to fully illustrate certain variations possible within the scope of the invention.

Figure 2:
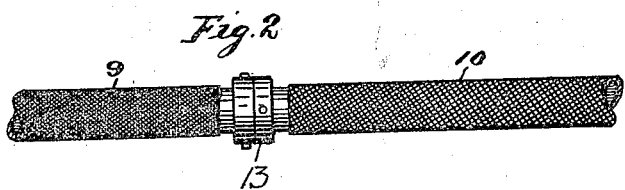

Fig. 2 presents fragments of two adjacent hose sections employed in the system and shows the difference in the texture of the same.

In carrying out the system any suitable means of supplying water under pressure to the distributing means may be employed, such for instance as a natural fall, an elevated reservoir, a siphon or a power pumping plant. In the drawings, for ease of illustration, the latter has been shown, the numeral 1 indicating a pump of any approved type, driven by a gasolene motor 2, both being mounted upon a stone boat, truck or other vehicle 3 which may be moved to a suitable source of water supply.

The pump 1 is provided with a suction pipe 4, preferably flexible and extendible so that it may be made to reach a stream or pond from which water is to be taken, and an outlet pipe 5 suitable for connection with a flexible hose 6 of rubber or other suitable material, which in turn connects with the distributing system proper at the point 7.

The distributing system consists of a conduit indicated as a whole by the letter A, connected with the supply pipe at the point 7, closed at its other extremity by the cap 8, and flexible so that it may be turned and twisted in any direction to reach all portions of the area of ground sought to be treated.

The conduit A is preferably formed from a plurality of hose sections 9, 10, 11 and 12, extending to any desired number and length within the capacity of the supply means, and connected with each other by the couplings 13, of any desirable type. The hose sections are of fabric of increasing perviousness from the source of supply outwardly, that 9 being of very closely woven material, that 10 a little coarser, that 11 still more open, until that 12, the last in the series and the most porous of all is reached. To further carry out the underlying idea of the invention the succeeding sections may be of gradually reduced diameter as they depart from the source of supply as is clearly shown by the difference in size between those 10, 11 and 12 in Fig. 1.

In practice the vehicle 3 is drawn by animal or other power to a suitable source of water supply and connected therewith by the pipe 4. The distributing system A is next connected with the hose 6, the members of the system A being laid upon the surface of the ground in such positions as seem most suitable to the conditions existing and the power is applied to supply the fluid. When the system A is filled the water will be vented through the pores of the various hose sections in proportion to the pressure in each and the openness of mesh of the fabric of which it is made, therefore, the hose section 9, being that adjacent the power and under the greatest pressure, is made of the finest fabric and that 12, being the most distant from the power and under the lowest pressure, is made from the most open fabric, the seepage being thus adjusted to be equal from each section in the line, and an even distribution from all parts of the system assured.

It is self evident of course, that variations of the texture in each section might be made to produce the same result in a small way, but it is preferable that sections of uniform mesh throughout should be used to get the results aimed at, on a large scale.

As previously mentioned, the hose sections might be also be of graduated diameter, and it is now easily understood how this might be made to assist the final result.

From the foregoing description it will be seen that the system as described does not in any way depend upon a level surface or upon a fall of the ground to convey the water to a desired point, but that it may be used to irrigate hilly or unequal ground surfaces equally with those that are level, and that, owing to its flexibility, it may be made very valuable in orchards, vineyards and other places difficult to reach with other systems.

Having thus fully described my said invention, what I claim is—

1. In an irrigating system, a distributing medium comprising a closed flexible conductor adapted for connection with a source of water supply under pressure and formed from fabric of increasing openness as the distance increases from the supply point.

2. In an irrigating system, a distributing medium comprising a flexible closed conductor adapted for connection with a source of water supply under pressure, the said conductor being formed from a plurality of connected hose sections of flexible material of increasing openness from the connected end to the extremity thereof, and means closing the said extremity of the said conductor.

3. An irrigating system comprising means to supply water under pressure and means to distribute the same, said last means comprising conduit having one end connected with the first means and the other end closed, said conduit being formed from a plurality of connected flexible hose sections of mesh fabric of increasing fineness from the closed end of the conduit to the connected end of the same.

4. An irrigating system comprising means to supply water under pressure and means to distribute the same, said last means comprising a conductor having one end connected with the first means and the other end closed, said conductor being formed from a plurality of connected flexible fabric hose sections of increasing diameter and decreasing perviousness from the closed to the connected end of the conductor.

In testimony whereof, I affix my signature.

ALEXANDER FRANKLIN HENDERSON.

Copies of this patent may be obtained for five cents each, by addressing the "Commissioner of Patents, Washington, D. C."